(12) United States Patent
Saulpaugh et al.

(10) Patent No.: US 6,298,354 B1
(45) Date of Patent: Oct. 2, 2001

(54) MECHANISM AND PROCESS TO TRANSFORM A GRAMMAR-DERIVED INTERMEDIATE FORM TO AN OBJECT-ORIENTED CONFIGURATION DATABASE

(75) Inventors: Thomas E. Saulpaugh, San Jose; Gregory L. Slaughter, Palo Alto; Bernard A. Traversat, San Francisco, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/253,839

(22) Filed: Feb. 19, 1999

(51) Int. Cl.[7] .................................................... G06F 17/30
(52) U.S. Cl. ........................................... 707/103; 707/100
(58) Field of Search ..................................... 707/103, 100

(56) References Cited

U.S. PATENT DOCUMENTS

| | | | |
|---|---|---|---|
| 5,551,029 | * 8/1996 | Jagadish et al. | 707/103 |
| 5,694,598 | * 12/1997 | Durand | 707/103 |
| 5,758,154 | * 5/1998 | Qureshi | 713/1 |
| 6,182,082 | * 1/2001 | Tanaka et al. | 707/103 |

FOREIGN PATENT DOCUMENTS 0 631 229  12/1994  (EP) .

OTHER PUBLICATIONS

Tennent, *Principles of Programming Languages*, Prentice Hall 1981, pp. 9–33.

Majka, "Getting Acquainted with NetInfo," *Nextstep In Focus*, Summer 1993, vol. 3, Issue 3, copyright NeXT Computer, Inc. 1993.

* cited by examiner

*Primary Examiner*—Jack Choules
*Assistant Examiner*—Cheryl Lewis
(74) *Attorney, Agent, or Firm*—Conley, Rose & Tayon, PC; B. Noël Kivlin

(57) ABSTRACT

A method and system for transforming an intermediate form into an object-oriented database. The intermediate form is derived from a grammatical form of an object-oriented database through the process of compilation. The grammatical form is an expression of an object-oriented database in a textual form according to a grammar. The intermediate form comprises an array of intelligent entry objects that encapsulate data with methods for manipulating that data. The intermediate form comprises entries as in the object-oriented database but lacks the infrastructure of the database. The intermediate form can be used to populate the object-oriented database with entries. Population takes place through a public API for accessing the object-oriented database; in other words, through an interface which declares methods for navigating the database and adding entries to the database. The object-oriented database is an object-oriented configuration database which stores configuration parameters pertaining to the software and hardware of a computer system, such as application programs, device drivers, system services, and other components. The object-oriented database is platform-independent and is therefore configured to be hosted on several different operating systems and computing platforms.

20 Claims, 11 Drawing Sheets

MECHANISM AND PROCESS TO TRANSFORM A GRAMMAR-DERIVED INTERMEDIATE FORM TO AN OBJECT-ORIENTED CONFIGURATION DATABASE

CROSS-REFERENCE TO RELATED APPLICATIONS

This application is related to U.S. patent application Ser. No. 09/253,840, filed on Feb. 19, 1999, entitled "AN INTELLIGENT OBJECT-ORIENTED CONFIGURATION DATABASE SERIALIZER"; U.S. patent application Ser. No. 09/253,841, filed on Feb. 19, 1999, entitled "PROCESS FOR TRANSFORMING CONFIGURATION DATABASE GRAMMAR INTO INTERMEDIATE FORM THAT SIMPLIFIES DATABASE GENERATION"; U.S. patent application Ser. No. 09/253,866, filed on Feb. 19, 1999, entitled "GRAMMAR TO REPRESENT A HIERARCHICAL OBJECT-ORIENTED DATABASF"; U.S. patent application Ser. No. 09/253,867, filed on Feb. 19, 1999, entitled "TRANSFORMATION CUSTOMIZER FOR CONFIGURATION DATABASE COMPILATION AND SERIALIZATION PROCESSES"; U.S. patent application Ser. No. 09/253,868, filed on Feb. 19, 1999, entitled "AN INTELLIGENT INTERMEDIATE STATE OF AN OBJECT-ORIENTED DATABASE"; U.S. patent application Ser. Nos. 09/079,501; 09/079,042; 09/079,500; 09/079,103; 09/079,102; 09/079,499; 09/079,043; and 09/107,048, which are all incorporated herein by reference.

BACKGROUND OF THE INVENTION

1. Field of the Invention

This invention relates generally to computer software and database systems. More particularly, the invention relates to object-oriented databases and computer languages.

2. Description of the Related Art

Database systems are serving increasingly important roles in today's society. Modern database systems enable users to gather, manipulate, and maintain massive amounts of information. A mere handful of examples of the myriad uses of database systems includes computerized library systems, automated teller machines, flight reservation systems, computerized parts inventory systems, and configuration databases for computer systems and networks.

Nevertheless, database systems are often difficult to maintain. Relational databases, for example, though powerful, are often accessible only through complicated, formal queries in languages such as SQL (Structured Query Language). It is expensive to hire or train experts with proficiency in such a highly technical field. Storage is also a problem, as data files in a database can become large and unwieldy, consuming finite storage resources. It is therefore an important consideration that a database system be easy to administer, and that the data be easy to enter, retrieve, edit, and store.

Some database systems are implemented using object-oriented techniques. Object-oriented databases, like the object-oriented programming model, are based on objects: units that combine one or encapsulate both data and related methods for operating on that data. Often, objects are related to one another in a class hierarchy which allows related objects to inherit attributes from one another. Object-oriented databases thus provide more accurate modeling of "real-world" entities. However, object-oriented databases are often just as difficult to implement, employ, and maintain as other types of databases. Furthermore, the interdependencies and relationships among objects in an object-oriented database complicate the issue of storage and often result in large, bloated database files which store unnecessary information.

One specific type of database is a database employed by an operating system to maintain configuration information that relates to components of software and/or hardware of a computer system. For example, such a configuration database may store configuration information relating to application programs, hardware devices which are coupled to the computer system, and/or elements of the operating system. These configuration databases may be implemented in many different ways. To exploit the advantages of the object-oriented paradigm, configuration databases may be implemented as object-oriented databases. Unfortunately, these configuration databases, object-oriented or otherwise, are associated with the same difficulties as other types of database systems. For instance, if information in a configuration database is generated dynamically upon the start-up of a computer system, then that information will be lost from session to session unless it is stored in a convenient way.

Therefore, it is desirable to provide an intelligent mechanism and process for storing an object-oriented configuration database.

SUMMARY OF THE INVENTION

The problems outlined above are in large part solved by various embodiments of a method and system for transforming an intermediate form of an object-oriented database into an active object-oriented database in accordance with the present invention. In one embodiment, the intermediate form is derived from a grammatical form of an object-oriented database. A grammatical form, an expression of an object-oriented database in a textual form according to a grammar, may be stored in a persistent form such as one or more files on disk. The grammatical form is human-readable and human-editable. The grammatical form can be created by hand, or it can be created from an object-oriented database in transient form through the process of serialization. The grammar is designed to be platform-independent and programming-language-independent and therefore descriptive of any hierarchical object-oriented database.

In one embodiment, the intermediate form is generated from the grammatical form through the process of compilation. In one embodiment, the intermediate form comprises an array of entry objects as would be found in the object-oriented database. The entry objects are intelligent: they encapsulate data with methods for manipulating that data. The methods include creating a database entry, creating a property associated with an entry, creating an attribute associated with an entry or property, querying the last entry, property, or attribute created, and finalizing entry storage. The intermediate form comprises entries as in the object-oriented database but lacks the infrastructure of the database: for instance, the intermediate form is not accessible by application programs as the database is.

In one embodiment, the intermediate form can be used to populate the object-oriented database with entries. Population takes place through a public API for accessing the object-oriented database; in other words, through interfaces which declare methods for navigating the database and adding entries to the database. In one embodiment, both compilation and database population are initiated when a grammatical form embodied in a Java™ object called a StaticTree is passed to a Java™ object called a StaticTreePopulator.

In various embodiments, the invention further provides a database transformation system and method wherein an active object-oriented database is serialized into a persistent form which is described by a grammar, wherein the persistent, grammatical form is compiled into an intelligent intermediate form, and wherein serialization and compilation may be modified to accept complex data types.

In one embodiment, the object-oriented database is an object-oriented configuration database which stores configuration parameters pertaining to the software and hardware of a computer system, such as application programs, device drivers, system services, and other components. In one embodiment, the object-oriented database is a platform-independent one, such as the Java™ System Database, and is therefore configured to be hosted on several different operating systems and computing platforms. In one embodiment, database transformation according to the present invention is implemented as a package of classes and interfaces in the object-oriented Java™ Language.

BRIEF DESCRIPTION OF THE DRAWINGS

Other objects and advantages of the invention will become apparent upon reading the following detailed description and upon reference to the accompanying drawings in which.

Figure 1:
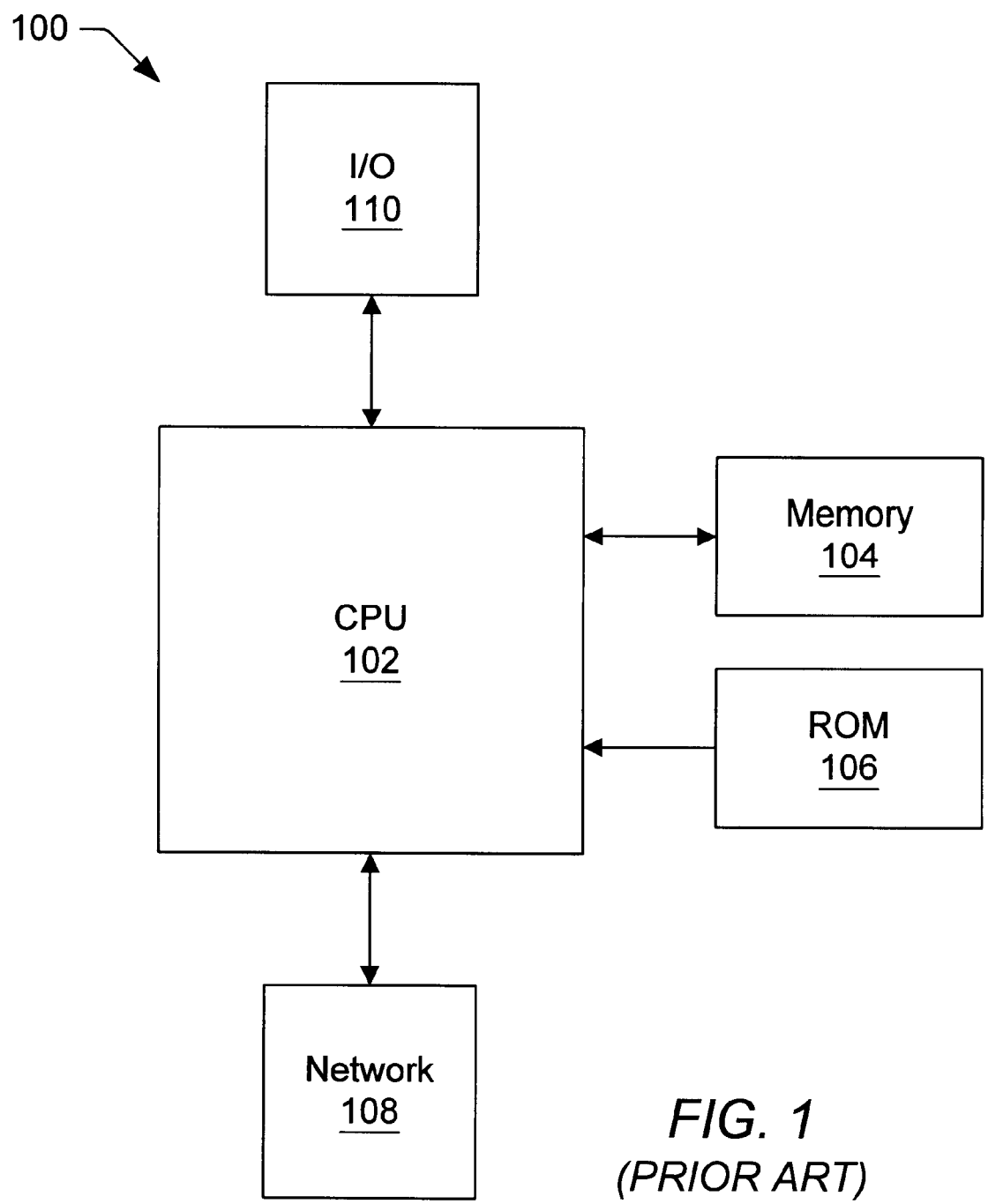
FIG. 1 is an illustration of a computer system in one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is an illustration of a typical, general-purpose computer system 100 which is suitable for implementing database transformation in accordance with the present invention. The computer system 100 includes at least one central processing unit (CPU) or processor 102. The CPU 102 is coupled to a memory 104 and a read-only memory (ROM) 106. The memory 104 is representative of various types of possible memory: for example, hard disk storage, floppy disk storage, removable disk storage, or random access memory (RAM). As shown in FIG. 1, typically the memory 104 permits two-way access: it is readable and writable. The ROM 106, on the other hand, is readable but not writable. The memory 104 and/or ROM 106 may store instructions and/or data which implement all or part of the database transformation system and method described in detail below, and the memory 104 and/or ROM 106 may be utilized to install the instructions and/or data. In various embodiments, the computer system 100 may comprise a desktop computer, a laptop computer, a palmtop computer, a network computer, a personal digital assistant (PDA), an embedded device, a smart phone, or any other computing device which may exist now or which may be developed in the future.

The CPU 102 may be coupled to a network 108. The network 108 is representative of various types of possible networks: for example, a local area network (LAN), wide area network (WAN), or the Internet. Database transformation in accordance with the present invention may therefore be implemented on a plurality of heterogeneous or homogeneous networked computer systems 100 through one or more networks 108. The CPU 102 may acquire instructions and/or data for implementing database transformation in accordance with the present invention over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing database transformation in accordance with the present invention through the input/output bus 110.

In implementing database transformation, the computer system 100 executes one or more computer programs. The computer programs may comprise operating system or other system software, application software, utility software, Java™ applets, and/or any other sequence of instructions. An operating system performs basic tasks such as recognizing input from the keyboard, sending output to the display screen, keeping track of files and directories on the disk, and controlling peripheral devices such as disk drives and printers. The operating system or other system software may also include a Java™ System Database (JSD) on particular Java™-enabled computer systems, as will be described in detail below. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

As will be described in further detail below, the computer system 100 implements a system and method for transforming a grammar-derived intermediate form to an object-oriented configuration database through the process of database population. In various embodiments, the computer system 100 further implements a database transformation system and method wherein an active object-oriented database is serialized into a persistent form which is described by a database description grammar, wherein the persistent, grammatical form is compiled into an intelligent intermediate form, and wherein serialization and compilation may be modified to accept complex data types. The persistent form may comprise one or more containers. Containers may reside in various forms in the memory 104 on one or more computer systems 100. The database transformation processes may also be referred to as the pushing and pulling of content to and from containers. The pushing and pulling may take place to and from the memory 104, over the network 108, and/or over the I/O bus 110.

As used herein, an object-oriented database is a database, database system, database management system, electronic filing system, or other computerized collection of information which stores items of data as objects. An object typically includes a collection of data along with methods for manipulating that data. In one embodiment, the database is a configuration database. As used herein, a configuration database is a database, database system, database management system, electronic filing system, or other computerized collection of information which stores information relating to the components and/or parameters which characterize a computer system or systems.

In one embodiment, the database is implemented using the resources of the object-oriented Java™ Platform and the object-oriented Java™ Language. Furthermore, database transformation is provided via one or more programming interfaces, also known as application programming interfaces or APIs. As used herein, an API is a set of routines, protocols, methods, variables, tools, "building blocks," and/ or other resources for building software applications. Therefore, a single API or package of APIs can actually comprise a plurality of APIs of lesser scope. In one embodiment, the database transformation APIs comprise object-oriented interfaces and classes developed in the Java™ Language. These database transformation APIs provide database transformation in accordance with the present invention to Java™ applications which utilize the APIs as "building blocks."

The Java™ Language is described in *The Java Language Specification* by Gosling, Joy, and Steele (Addison-Wesley, ISBN 0-201-63451-1), which is incorporated herein by reference. The Java™ Language is an object-oriented programming language. In an object-oriented programming language, data and related methods can be grouped together or encapsulated to form an entity known as an object. The object is the fundamental building block of object-oriented programming. The data structures within an object may alternately be referred to as the object's state, its attributes, its fields, or its variables. In the Java™ Language, the data structures are normally referred to as the variables of the object. If the object represents a telephone, the variables may include a telephone number, a color and a type (e.g., touch-tone or pulse). The procedures which operate on the variables are referred to in Java™ as the methods of the object. In the telephone example, the methods could include ringing, receiving a call or placing a call. These methods will be discussed in more detail below. The variables and methods of an object may all be referred to as the members of the object.

In object-oriented programming, the grouping together of the variables and methods within an object is referred to as encapsulation. When the variables relating to an object and the methods which might affect the object are encapsulated within the object, other entities usually do not have direct access to these data and procedures. The other entities instead call on the object itself to invoke its own methods and thereby operate on its own data. The encapsulation of the members of the object thereby provides some protection for the data within the object and prevents unauthorized, unwanted, or unintended manipulation of the data. This is sometimes referred to as data hiding. (The concept of data hiding through encapsulation should be distinguished from the hiding of variables in Java™ variable declarations, as explained in more detail below).

If a user wants to hide the data within an object, the variable which contains the data is made private. Private variables within an object may only be accessed by the methods of the object. Because it may, in some cases, be inconvenient or impractical to require manipulation of certain data through the methods of the associated object, some variables may be made public. These public variables are directly accessible to entities other than the object with which the variables are associated. Thus, in practice, the variables within objects normally comprise some which are hidden or inaccessible and some which are public.

All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Classes in the Java™ Language may be hierarchical. That is, some classes may be subclasses of a higher class, also known as a superclass. For example, in addition to the telephone class (i.e., superclass) above, subclasses may be created for mobile phones and speaker phones. An object which is instantiated from the mobile phone class will also be an object within the telephone class. It may therefore be treated as belonging to the narrower class of only mobile phones, or it may be treated as belonging to the broader class of telephones in general. In the Java™ Language, the subclass (e.g., mobile phones) is said to extend the superclass (e.g., telephones). Alternatively, the superclass is said to be extended by the subclass. For the purposes of this disclosure, a subclass is considered to extend all or any of the classes which are above it in the hierarchy. It may also be said that the subclass directly extends the class immediately above it in the hierarchy, and indirectly extends higher classes in the hierarchy. For example, if a parent class is extended by a first subclass and that subclass is in turn extended by a second subclass, the second subclass can be said to extend the parent class as well as the first subclass. This terminology will also be applied to the hierarchical structure of interfaces, which will be described in more detail below.

This hierarchical definition of classes and subclasses based on shared variables and methods is very useful. A subclass includes all the variables and methods in the class of which it is a member (its parent class). The subclass is said to inherit the variables and methods of its parent class. This property is useful in defining subclasses because only those variables and methods which do not appear in the parent class need to be defined in the subclass (although variables or methods which appear in the parent class may be redefined in the subclass.) This allows the code written in the parent classes to be reused so that the programmer does not have to rewrite or cut and paste code into each new subclass. Methods that are defined in the parent class may, however, be redefined in subclasses. This is referred to as overriding or hiding the previously defined method(s). By redefining a variable which has already been defined in a superclass, the programmer may hide the previously defined variable (which is distinct from the object-oriented data-hiding concept inherent in encapsulation). In some object-oriented languages, subclasses may inherit variables and methods from several classes. This is called multiple inheritance. If a subclass can only inherit from one parent class, this is called single inheritance. The Java™ Language is characterized by single inheritance, not multiple inheritance.

This hierarchical class structure also allows the programmer to take advantage of a property referred to as polymorphism. Polymorphism is a mechanism by which various objects may be handled in the same way externally, even though there are differences in the way they are handled internally. In other words, the interface which the different objects present to an external entity is the same for each object, but the details of each object's implementation may vary. This allows objects instantiated from different subclasses to be handled identically even though the subclasses are not identical. For example, assume that a drawing program implements a class for shapes, a subclass for circles, and a subclass for squares, each of which has a method called draw(). While draw() will be implemented differently for the circle subclass and the square subclass, the drawing program does not have to know the details of how a shape will be drawn, or even which of the shapes is to be drawn. The drawing program simply calls the draw() method for the object to be drawn and the implementation defined in the object's class will be used.

Another important element of the Java™ Language is the interface. Interfaces are closely related to classes. Interfaces may declare what classes do, but not how they do it. For example, in the case of the telephone class above, an interface would declare that a telephone could ring, place calls, and receive calls, but it would not define the way in which this was accomplished. A telephone class, on the other hand, would set out the functions that define each of these actions so that when a telephone is instantiated, it can actually ring, place a call, or receive a call (in the context of the application). An interface may declare methods and/or constants. To utilize an interface, one or more classes must implement the interface.

Figure 2:
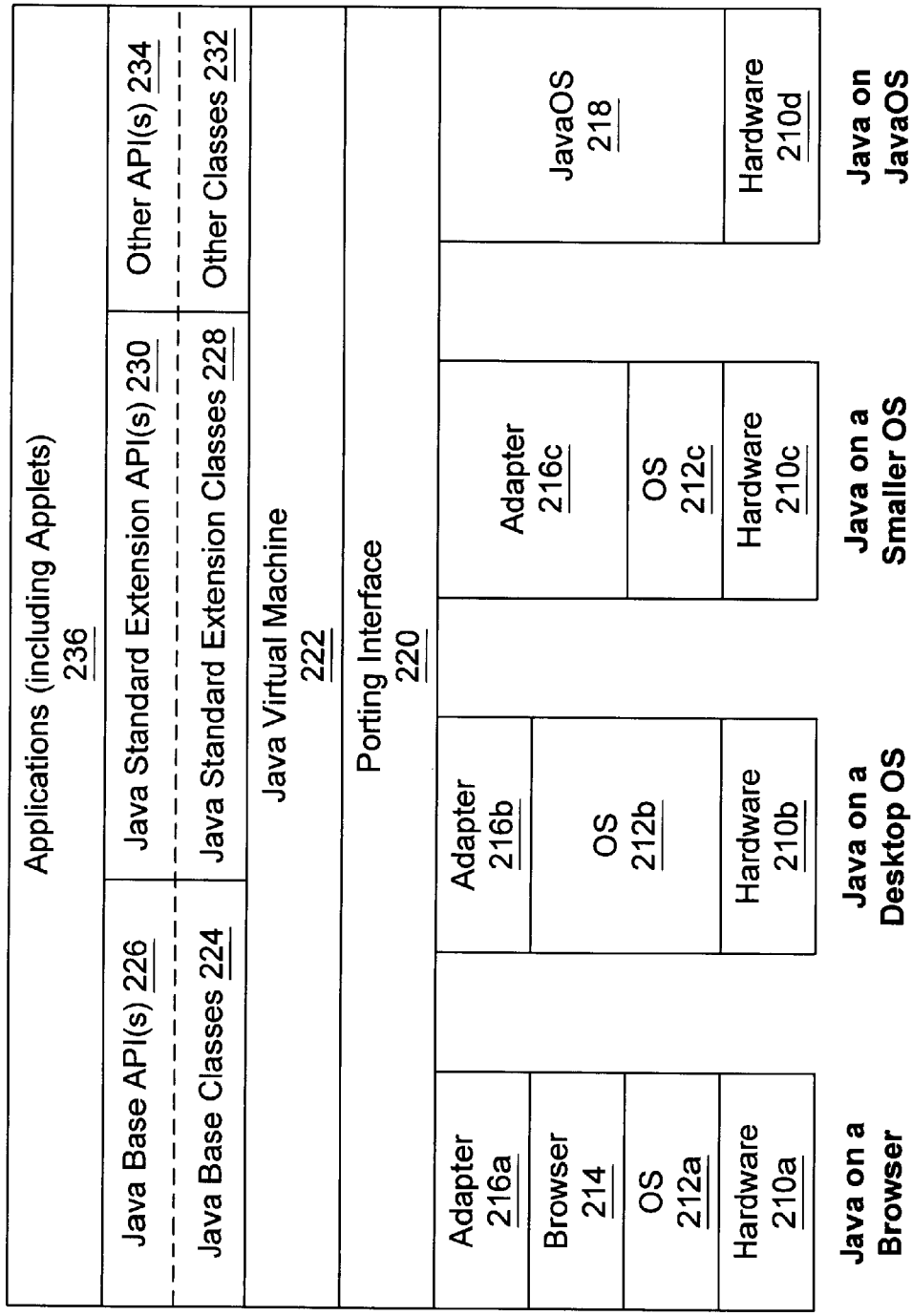
FIG. 2 is an illustration of the Java™ Platform and the relationships between the elements thereof in one embodiment.

The Java™ Platform which utilizes the object-oriented Java™ Language is a software platform for delivering and running the same applications on a plurality of different operating systems and hardware platforms. As will be described in further detail below, the Java™ Platform includes system-dependent portions and system-independent portions, and therefore the Java™ Platform may be thought of as having multiple embodiments. The Java™ Platform sits on top of these other platforms, in a layer of software above the operating system and above the hardware. FIG. 2 is an illustration of the Java™ Platform and the relationships between the elements thereof in one embodiment. The Java™ Platform has two basic parts: the Java™ Virtual Machine 222, and the Java™ Application Programming Interface (Java™ API). The Java™ API may be thought of as comprising multiple application programming interfaces (APIs). While each underlying platform has its own implementation of the Java™ Virtual Machine 222, there is only one Virtual Machine specification. The Java™ Virtual Machine specification is described in *The Java Virtual Machine Specification* by Lindholm and Yellin (Addison-Wesley, ISBN 0-201-63452-X), which is incorporated herein by reference. By allowing the Java™ applications 236 to execute on the same Virtual Machine 222 across many different underlying computing platforms, the Java™ Platform can provide a standard, uniform programming interface which allows Java™ applications 236 to run on any hardware on which the Java™ Platform has been implemented. The Java™ Platform is therefore designed to provide a "write once, run anywhere" capability.

As used herein, "applications" includes applets as well as traditional desktop programs. Applets are Java™ programs that require a browser such as Netscape Navigator, Microsoft Internet Explorer, or Sun Microsystems HotJava to run. A browser is a piece of software that allows a user to locate and display Web pages, often encoded in HyperText Markup Language (HTML) and found on the Internet. Typically, applets are embedded in a Web page, downloaded over the Internet from the server, and run on a client machine. Because of security concerns, however, Java™ applets often do not have full access to system services such as read and write access to a file on disk. All Java™ applications 236 require the Java™ Platform to run.

Developers use the Java™ Language and Java™ APIs to write source code for Java™-powered applications 236. A developer compiles the source code only once to the Java™ Platform, rather than to the machine language of an underlying system. Java™ programs compile to bytecodes which are machine instructions for the Java™ Virtual Machine 222. A program written in the Java™ Language compiles to a bytecode file which can run wherever the Java™ Platform is present, on any underlying operating system and on any hardware. In other words, the same exact Java™ application can run on any computing platform that is running the Java™ Platform. Therefore, Java™ applications 236 are expressed in one form of machine language and are translated by software in the Java™ Platform to another form of machine language which is executable on a particular underlying computer system.

The Java™ Virtual Machine 222 is implemented in accordance with a specification for a "soft" computer which can be implemented in software or hardware. As used herein, a "virtual machine" is generally a self-contained operating environment that behaves as if it were a separate computer. As shown in FIG. 2, in one embodiment the Java™ Virtual Machine 222 is implemented in a software layer. The same Java™ Virtual Machine 222 can run on a variety of different computing platforms: for example, on a browser 214 sitting on top of an operating system (OS) 212a on top of hardware 210a; on a desktop operating system 212b on top of hardware 210b; on a smaller operating system 212c on top of hardware 210c; or on the JavaOS operating system 218 on top of hardware 210d. Computer hardware 210a, 210b, 210c, and 210d may comprise different hardware platforms. JavaOS 218 is an operating system that is optimized to run on a variety of computing and consumer platforms. The JavaOS 218 operating environment provides a runtime specifically tuned to run applications written in the Java™ Language directly on computer hardware without requiring another operating system.

The Java™ API or APIs form a standard interface to Java™ applications 236, regardless of the underlying operating system or hardware. The Java™ API or APIs specify a set of programming interfaces between Java™ applications 236 and the Java™ Virtual Machine 222. The Java™ Base API 226 provides the basic language, utility, I/O, network, GUI, and applet services. The Java™ Base API 226 is typically present anywhere the Java™ Platform is present. The Java™ Base Classes 224 are the implementation of the Java™ Base API 226. The Java™ Standard Extension API 230 provides additional capabilities beyond the Java™ Base API 226. The Java™ Standard Extension Classes 228 are the implementation of the Java™ Standard Extension API 230. Other APIs in addition to the Java™ Base API 226 and Java™ Standard Extension API 230 can be provided by the application or underlying operating system. A particular Java™ environment may include additional APIs 234 and the classes 232 which implement them. Each API is organized by groups or sets. Each of the API sets can be implemented as one or more packages or namespaces. Each package groups together a set of classes and interfaces that define a set of related data, constructors, and methods, as is well known in the art of object-oriented programming.

The porting interface 220 lies below the Java™ Virtual Machine 222 and on top of the different operating systems 212b, 212c, and 218 and browser 214. The porting interface 220 is platform-independent. However, the associated adapters 216a, 216b, and 216c are platform-dependent. The porting interface 220 and adapters 216a, 216b, and 216c enable the Java™ Virtual Machine 222 to be easily ported to new computing platforms without being completely rewritten. The Java™ Virtual Machine 222, the porting interface 220, the adapters 216a, 216b, and 216c, the JavaOS 218, and other similar pieces of software on top of the operating systems 212a, 212b, and 212c may, individually or in combination, act as means for translating the machine language of Java™ applications 236, APIs 226 and 230, and Classes 224 and 228 into a different machine language which is directly executable on the underlying hardware.

Figure 3:
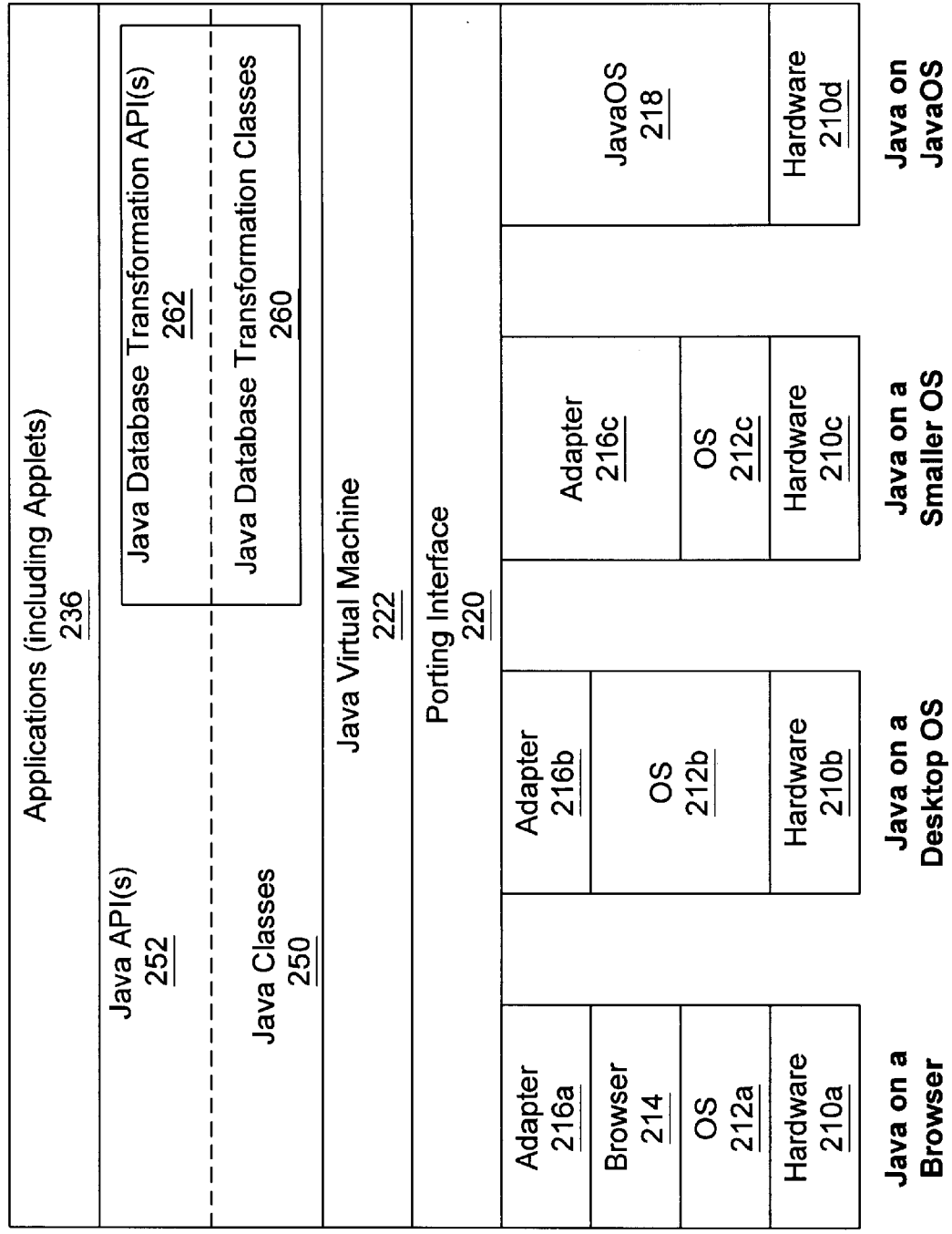
FIG. 3 is an illustration of the Java™ Platform including Java™ Database Transformation functionality in one embodiment of the invention.

FIG. 3 is an illustration of the Java™ Platform including database transformation functionality in one embodiment of the invention. The Java™ API 252 comprises all of the API sets available to the applications 236: the Java™ Base API 226, optionally the Java™ Standard Extension API 230, and other APIs 234. The Java™ API 252 also encompasses the Java™ database transformation API(s) 262, the programming interfaces between applications 236 and the Java™ Virtual Machine 222 for transforming a database from a run-time, object-oriented form to a persistent, grammatical form and back again. The Java™ Classes 250 are the implementation of the Java™ API 252, including the Java™ Base Classes 224, optionally the Java™ Standard Extension Classes 228, and other classes 232. The Java™ database transformation API(s) 262 are implemented by the Java™ database transformation classes 260.

Therefore, as shown in FIG. 3, the database transformation framework is implemented in a software layer of APIs and classes between the Virtual Machine 222 and the Java™ Applications 236. The APIs and the applications comprise Java™ source code and/or bytecodes which are executable by the Virtual Machine. Therefore, the APIs can be ported without alteration to any underlying computing platform on which the Java™ Virtual Machine has been implemented. Because of the widespread implementation of the Java™ Virtual Machine, the APIs can be implemented with ease on a plurality of operating systems and computer hardware. The database transformation APIs thus enable Java™ applications to implement the system and methods of the present invention in a standardized, cross-platform manner.

The system, method, and storage medium of the present invention are applicable to any object-oriented database. In one embodiment, the object-oriented configuration database is a Java™ System Database (JSD), also known as a JavaOS System Database. The JSD is platform-independent but was developed in conjunction with JavaOS. In other words, the JSD could be hosted on many different operating systems, including JavaOS. The JSD generally allows an operating system, system services, applications, utilities, and other software components to store and retrieve configuration information concerning the software and hardware of a platform, typically a Java™-based platform such as a network computer (NC). Configuration information is arranged to describe, for example, the physical devices that are present in a machine associated with the JSD, the system software services that are installed, and specific user and group application profiles. The JSD serves as a central repository to store, as well as access, substantially any information which is used for configuration purposes.

The JSD is comprised of a hierarchy or tree of entries. Entries can represent files, applications, users, devices, public interfaces, and many other components. Each entry has a single parent entry and any number of child entries. An entry has a unique name which describes the location of the entry relative to the root of the tree. The root is identified by a single forward slash ("/"). Each entry is uniquely identified using a UNIX-style pathname, composed of a list of all entries preceding it in the hierarchy, with each component separated by a forward slash ("/"). In addition, an entry may also contain zero or more associated properties and/or attributes. A property is a user-defined piece of information which consists of a name-value pair. This information may be any Java™ object. An attribute is system-defined data or meta-data and is generally not available to non-system components. An attribute may be an entry attribute which is associated with the entry itself, or an attribute may be a property attribute which is associated with a specific property of an entry.

A large amount of information in the JSD is transient: it does not survive across runtime sessions. The JSD is populated, that is, filled with entries relating to configuration data, during platform initialization. Additional configuration data is added and/or removed when the operating system boots. Transient information must be repopulated from its source into the JSD every time the computer system or operating system boots. Every time JavaOS boots, for example, the JSD is repopulated with information concerning which devices are installed on the platform. The JSD provides a population interface in the Java™ Language for adding configuration data from a variety of sources: for example, files, a network, the host operating system, applications, and drivers. In one embodiment, the Java™ Language interface for JSD population is named TreePopulator.

The JSD uses a split design: one part resides on a server computer system, and the other part resides on a client computer system. On the server, the configuration information is stored for each user and client machine on the network. At the time the client computer system boots, each client database is populated from the server database with configuration information about a particular machine, group of machines, and machine platform. At the time a user logs in, the client database is populated with configuration information about the user who is logging in and the group of users he or she belongs to, if any.

Figure 4:
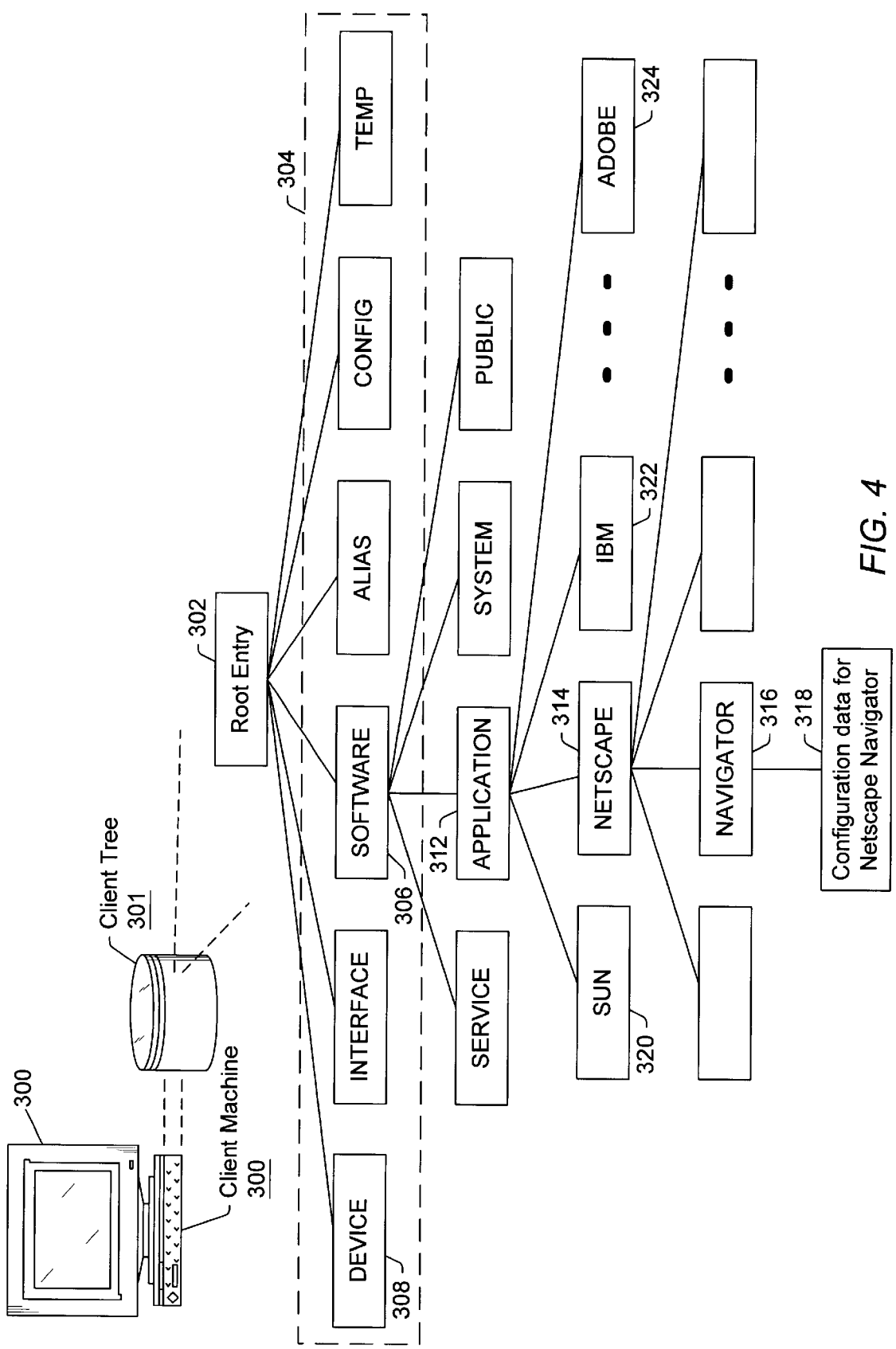
FIG. 4 is an illustration of a default hierarchy of the Java™ System Database in one embodiment of the invention.

FIG. 4 illustrates the hierarchical nature of the JSD. In one embodiment, the JSD is divided into six standard namespaces, or sub-trees of related entries, which are created when JavaOS starts: Temp, Device, Interface, Alias, Software, and Config. Entries within a given namespace share common characteristics. A default namespace manager manages each namespace, controlling how entries are created, added, accessed, removed, and updated for a particular namespace. When an entry is published (that is, added to the database and thus made public), it inherits its parent's namespace manager by default.

The Temp namespace is available as temporary storage for both application and system software settings. The Device namespace contains the set of devices available to the local platform. The Interface namespace contains entries that reference services that implement public Java interfaces. The Alias namespace contains entries that reference entries in the Interface namespace and provide friendly naming schemes for existing entries. The Software namespace contains entries for each installed software component. The Config namespace maintains client configuration information and is usually stored on servers.

In one embodiment, the Temp, Device, Interface, and Alias namespaces are transient: they do not survive across runtime sessions, typically because they are stored in volatile memory and not in nonvolatile or persistent storage. The Config namespace is persistent. The Software namespace is transient on clients but is backed up persistently on the server.

FIG. 4 is an illustration of a tree structure representing an exemplary Java System Database on a client computer system. The client tree 301 resides on a networked client machine 300 and relates to configuration data of the client computer system 300. The client machine 300 is an example of a computer system 100 as discussed with reference to FIG. 1. The hierarchy of the client tree 301 is manifested using an n-way tree. At the root of the tree is a root entry 302 which does not contain any data. A first level of nodes 304 in client tree 301 collectively define the six standard namespaces as discussed above.

For example, the Software namespace begins at node 306 and includes all nodes and data branching from node 306. All entries in the Software namespace relate to configuration data regarding software applications for the client computer system 300. Entries in the data schema are made up of a unique name, a list of children (entries below the given entry), and a set of tuples. Each tuple contains a property name and associated property value (i.e., a name-value pair). In a word processing program, for example, a property name can be "font" and the property value can be "Times Roman." Similarly, all entries under the Device namespace 308 are entries that are related to configuration information of the client computer system 300. Every entry in the hierarchy may act as both an entry in a sub-tree and the root of a sub-tree having descendant entries or child nodes. Each namespace in layer 304 is described in U.S. Provisional Application filed on May 14, 1998 and commonly assigned, entitled "JAVA SYSTEM DATABASE", which is incorporated herein by reference.

The Software namespace 306 contains a list of installed and/or available system services such as device drivers, user applications, and user configuration information. The Software namespace 306 includes four categories: application, system, service, and public. In the application category 312, for example, an entry com.Netscape 314 contains the company-unique name "Netscape." Below com.Netscape 314 is an entry 316 for Netscape Navigator, one of Netscape's products. Below the Navigator entry 316 is an entry 318 storing company-specific configuration information relating to Netscape Navigator. The Netscape Navigator application program could access the configuration information 318 while the application program is executing. In a similar way, other application programs could access their own specific configuration entries while executing. Entries 320, 322, and 324 represent other vendors which will also have application-level entries similar to entry 316.

Figure 5:
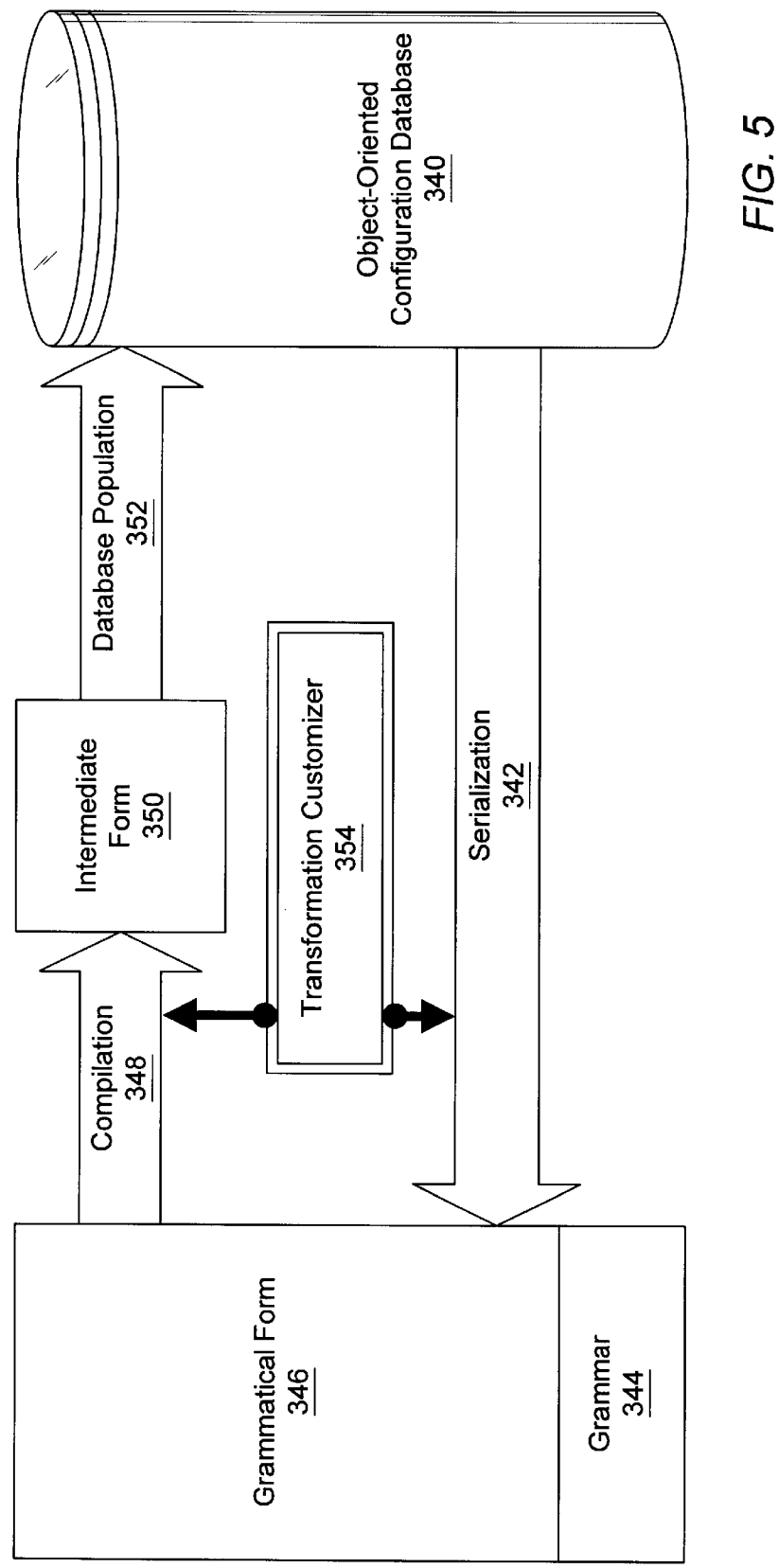
FIG. 5 is a block diagram illustrating an overview of the transformation of an object-oriented database to and from a grammatical form in one embodiment of the invention.

An object-oriented database such as the JSD is largely transient and thus must typically be recreated with every runtime session. Furthermore, the JSD may be difficult to access for data entry and retrieval when it is active in the cache as described above. Therefore, one embodiment of the present invention provides for database transformation from the active, run-time form to a more manageable, persistent form, and then back again. FIG. 5 illustrates an overview of database transformation in accordance with one embodiment of the present invention. The object-oriented configuration database 340 can undergo a process of serialization 342 which transforms the database into a persistent form in one or more containers. The persistent form, also known as a grammatical form 346, is described by a grammar 344. The grammatical form 346 can undergo a process of compilation 348 which transforms the persistent form into an intelligent intermediate form 350. The intelligent intermediate form 350 can be turned back into the object-oriented database 340 through the process of database population 352. A transformation customizer or plug-in 354 can be used to extend the grammar 344 to allow for the use of complex data types in serialization 342 and compilation 348. Although the grammatical form 346 is much smaller than the in-memory object-oriented database 340 due to improved serialization 342, no important information is permanently lost when transforming one into the other, and therefore one form can be transformed into the other form and back again an indefinite number of times.

The JSD is an in-memory repository or cache which can be stored in persistent containers such as files in accordance with the present invention. The JSD defines a public API for dynamically adding, removing, and modifying entries contained within the database. In one embodiment, the public API is a Java™ Language interface named TreePopulator. For instance, when the grammatical form is parsed by the configuration tree compiler into an intermediate form, the resulting hierarchical entries of the intermediate form are imported into the JSD using the public API. In this way, the content of the JSD is pushed and pulled from the containers. A single JSD can push and pull content from multiple containers as required to satisfy clients. The JSD pushes and pulls content without regard to container count and implementation. The container count and implementation vary with the complexity and needs of the specific platform. For example, a simple platform such as a cellular phone may have a single persistent container stored in non-volatile RAM (NVRAM), while a more complex platform such as a network computer may use multiple file-based containers or even an enterprise network directory service such as LDAP (Lightweight Directory Access Protocol).

The values and structure of the JSD content remain the same whether active in the cache or persistently stored in a container. However, the format of the content does change when moved to and from a persistent container. When the content is active in the cache, its format (how its values and structure are represented to software) is that of a Java™ object. Cached JSD objects behave in a similar way to other objects in the Java™ Language, except that a JSD object's construction and serialization is automated by the JSD.

When the content is stored in a container outside the cache, however, the object's values and structure are represented using the database description grammar (DDG or grammar) in accordance with the present invention.

As used herein, serialization is any process of transforming one or more objects from a run-time or transient form to a persistent form. The Java™ Language supports a default object serialization that flattens a graph of objects, often hierarchical, into a byte stream. The byte stream can then be stored in one or more persistent containers such as files. Subsequently, the byte stream can be reconstituted into live Java™ Language objects. Nevertheless, the default method takes a complete snapshot of the live object graph, including internal references to other objects. Therefore, the default method is slow and produces a large amount of data to store. For largely the same reasons, and especially because the default serialized form includes references among objects, the default form cannot be edited manually. Improved serialization according to one embodiment of the present invention provides a number of advantages over the default method: faster speed, smaller output size comprising only the key state, a simple object hierarchy, and text that is editable by hand using a text editor. Furthermore, the improved serialization method according to one embodiment of the present invention produces a persistent form that is not dependent on the Java™ Language or Java™ Platform.

In one embodiment, serialization is implemented in the Java™ Language. The class StaticTreeSerializer contains the code to push database content from the in-memory JSD cache into a grammar-based, persistent container such as a file. An instance of StaticTreeSerializer requires five parameters to be passed to its constructor. The first two parameters are PrintStream instances: an error log and a debugging log. The third construction parameter is a debugging level that controls how much compilation progress information is output to the debug log. The fourth parameter is an instance of a Entry (javaos.javax.system.data-base.Entry) which used by the serializer to reference a portion (a tree) of the active database to serialize. In other words, the Entry parameter to the serializer determines which node will be the root of the tree or sub-tree to be serialized. The final construction parameter is a reference to an output file to hold the grammatical form. The output file can be specified with a descriptor (java.io.FileDescriptor), a file name (java.lang.String), a file (java.io.File), or a file output stream (java.io.FileOutputStream).

Figure 6:
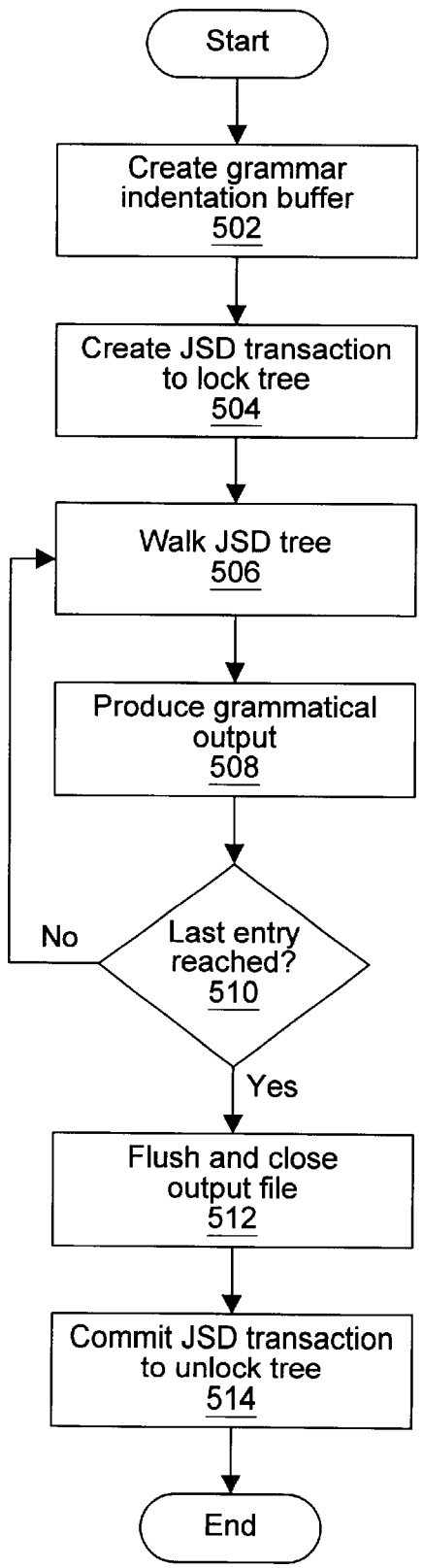
FIG. 6 is a flowchart illustrating serialization in one embodiment of the invention.

FIG. 6 illustrates serialization of a tree in one embodiment. In step 502 the serializer begins by creating a grammar indentation buffer. This buffer contains spaces to indent the grammar for each entry, property, or attribute scope. Next, in step 504 the serializer creates a JSD transaction that locks the target tree of entries for exclusive access. In steps 506 and 508, respectively, the serializer then uses JSD APIs to walk the tree of entries and produce a description of the entries in grammatical, textual form to the output file. In doing so, the serializer maintains only the key state of the objects, such as the hierarchy, names of entries, and name-value pairs for properties and attributes, according to the grammar which is described in detail below. Unlike default Java™ serialization, the serializer of the present invention does not maintain a complete in-memory snapshot of objects, and thus the data produced is much smaller in size than with default serialization. Furthermore, by eliminating Java™-specific object information such as dependencies from one object to another, the textual form is conveniently editable by hand with a text editor program. Steps 506 and 508 continue until the serializer determines in step 510 that the last entry has been reached. After the last entry in the JSD tree has been processed, the output file is flushed and closed in step 512. Finally, in step 514, the JSD transaction is committed and the serializer exits.

In one embodiment, the text-based, grammatical description of the contents of the object-oriented database is a static configuration tree. A static configuration tree provides a mechanism whereby hierarchies such as those of an object-oriented configuration database are defined and expressed in a persistent medium using a grammar. The configuration tree is static because each time the grammar description is compiled, it results in the same hierarchy being created within the JSD. Static configuration information is ideal for devices, applications, and services that are simple in nature and do not require dynamic discovery of devices or resources at boot time or service load time.

As used herein, a grammar is a set of rules that govern the structure and/or relationships of terms and/or symbols in a language. As used herein, a grammatical form is a collection of information which is expressed under the rules of a particular grammar. The grammar provided by the present invention is independent of any platform or programming language: the grammar could be used to describe any hierarchical, object-oriented database. A small number of keywords and a simple syntax define the static configuration grammar. Generally speaking, a syntax defines a structure in which the keywords and other elements can be expressed. In other words, a syntax generally relates to the form of the grammar. In one embodiment, the keywords are as follows:

TREE name: Defines the static tree root with the specified name.

ENTRY name: Defines a new entry with the specified name.

PROPERTIES: Defines one or more properties for the entry.

ATTRIBUTES: Defines one or more attributes to pertain to the entry if no properties have yet been defined, or otherwise to the last property defined.

BUSINESS_CARD: Defines a collection of configuration information for an application, device driver, or other software component.

The TREE and ENTRY keywords are used to define the tree root and the tree sub-hierarchy, respectively. The ATTRIBUTES and PROPERTIES keywords, along with name-value pairs, define attributes and properties to be associated with an entry. The scope of a keyword is delimited using opening and closing braces (i.e., curly brackets) "{" and "}". The TREE keyword must appear first because it defines the root of the configuration tree.

Figure 7:
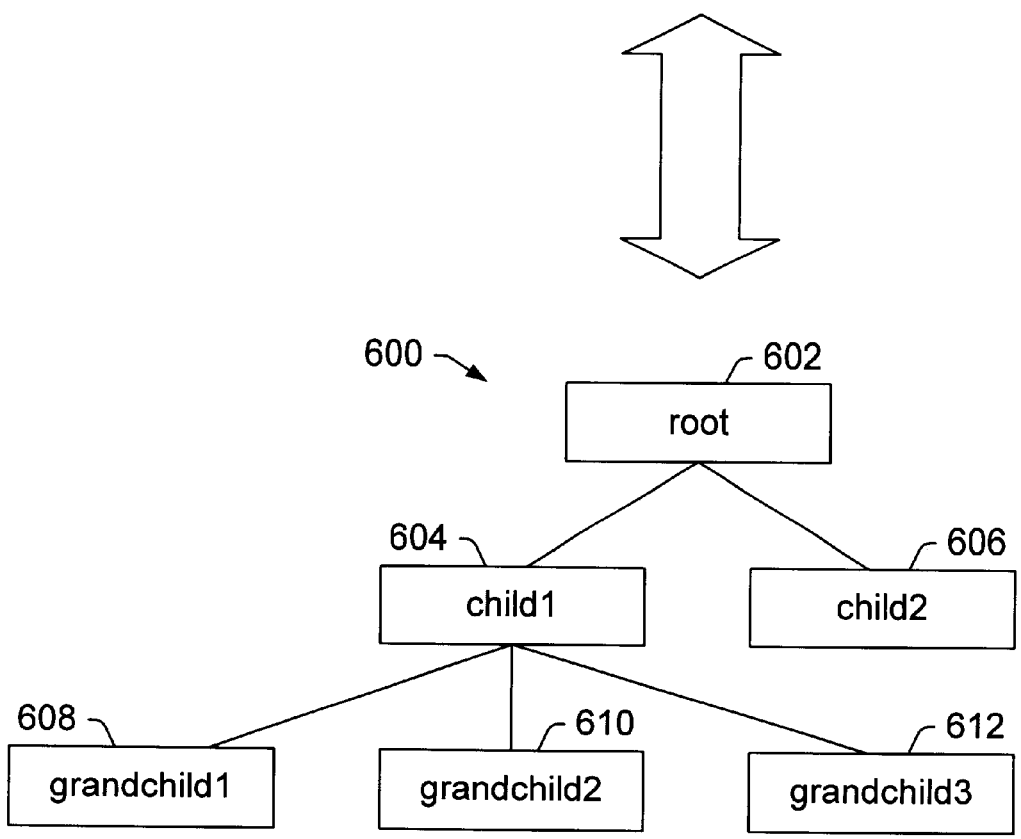
FIG. 7 is an illustration of the correspondence between a grammatical form and an object-oriented form of a database in one embodiment of the invention.

FIG. 7 illustrates an example of this hierarchy. A configuration tree 620 is defined using the TREE and ENTRY keywords and the scoping braces of the grammar described above:

```
TREE root {
   ENTRY child1 {
      ENTRY grandchild1 {
      }
      ENTRY grandchild2 {
      }
      ENTRY grandchild3 {
      }
   }
   ENTRY child2 {
   }
```

}

The static configuration tree 620 is different in form but identical in content to a configuration database 600. The root 602 has two children, child1 604 and child2 606. There are three grandchildren 608, 610, and 612, all belonging to child1 604. The tree 620 can be transformed into the database 600 through the processes of compilation and/or database population as described in detail below, and the database 600 can be transformed into the tree 620 through the process of serialization as described in detail above. Although the grammar allows the database to be represented in a much more compact form than the in-memory form of the database, no important information is permanently lost in transforming the database to or from the grammatical form. Therefore, the transformations can take place an indefinite number of times back and forth.

Figure 8:
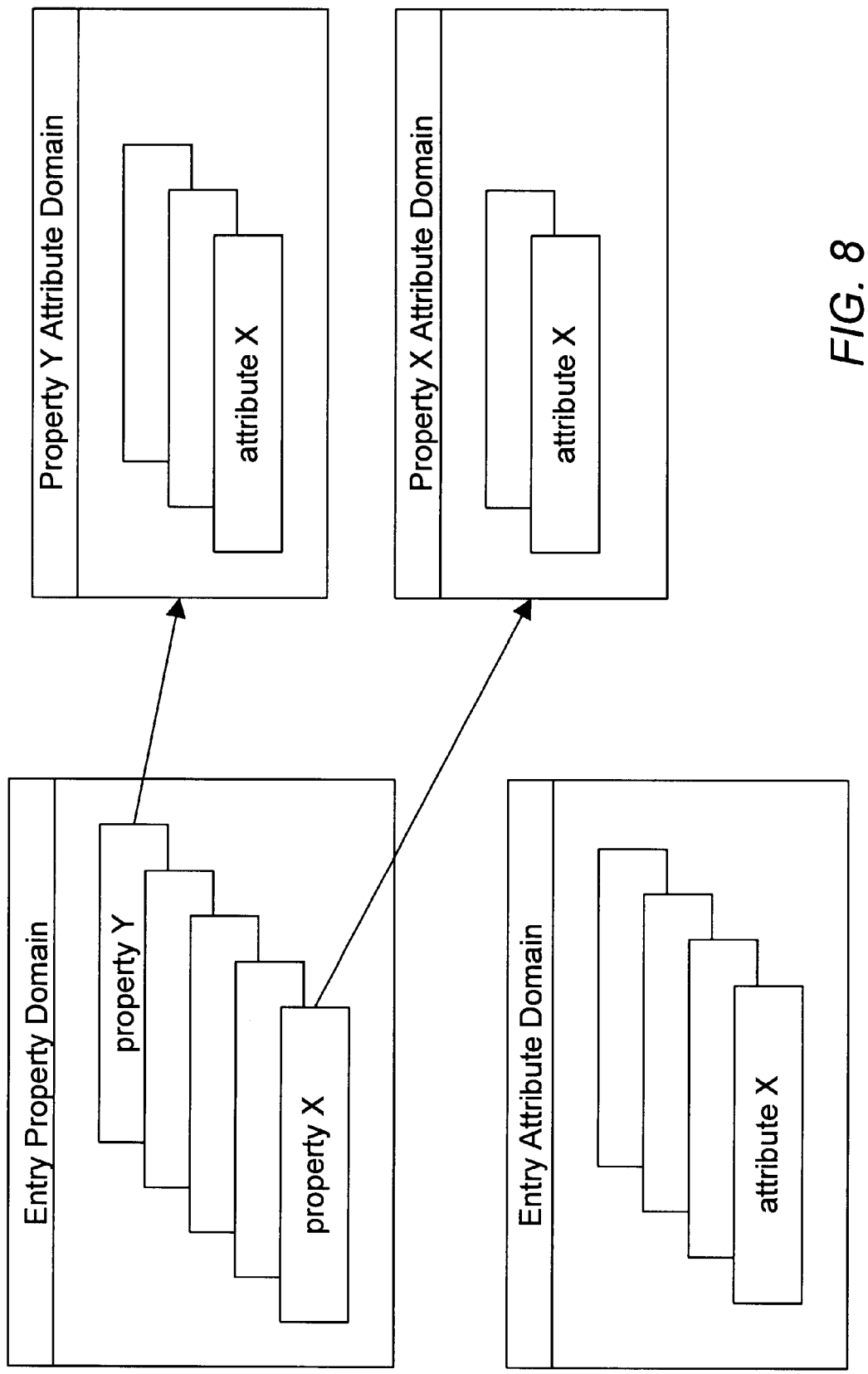
FIG. 8 is an illustration of property domains and attribute domains in the grammar provided by one embodiment of the invention.

While the hierarchy discussed with reference to FIG. 7 conveys information regarding the relationships of the entries, true entry customizing is accomplished using properties and attributes. FIG. 8 illustrates the property and attribute domains for a given entry. As shown in FIG. 8, properties pertain only to the entry itself, but attributes can be assigned either to the entry or to any existing property of the entry. The JSD public API provides methods for dealing with both types of attributes. The name of a property or attribute must be unique within its domain, but only within its domain. For example, as shown in FIG. 8, it is acceptable that the attribute "X" appears in all three defined attribute domains. Each "X" is distinct from the others because their respective scopes are different, and the three may have different values of different types. In one embodiment, properties and attributes are defined by the JSD to have names of the standard Java™ type java.lang.String and values of the standard Java™ type java.lang.Object. In one embodiment, null values are not permitted.

The PROPERTIES and ATTRIBUTES keywords are used to designate name-value pairs for the purpose of defining properties and attributes, respectively. For both properties and attributes, the general definition syntax is:

name=value;

In one embodiment, the "name" term must be compatible with java.lang.String and may therefore contain any Unicode character, except for the two-character sequence "/." (a forward slash followed by a period). The semicolon after the "value" term delimits each name-value pair. Using pseudo Backus-Naur Formalism (BNF) as is well-known in the art of computer languages, the value can be defined as:

value=[unicode_string|
  "[" type ":" val "]"|
  "[" type "[ ]:" val 0*["," val]"]"
]";"
type="boolean"|"byte"|"char"|"int"|"long"|"short"|"double"|"float"|"string"
val="true"|"false"|unicode_string|dec-val
unicode_string=0*unicode_char Furthermore, the value provided must match the specified type. The supported primitive types are: boolean, byte, char, int, long, short, double, float, string, and arrays thereof (booleano[ ], byte[ ], char[ ], int[ ], long[ ], short[ ], double[ ], float[ ], string[ ]). The default type is a Unicode string, which may also be explicitly specified using the string type. Similar to assigning the property or attribute name, a string value may be any series of Unicode characters compatible with java.lang.String. Note that the string value is not enclosed in quotation marks. For string values, the limitation on using the two-character sequence "/." (a forward slash followed by a period) does not apply. When the type specification is followed by the Java™ array specification characters "[ ]", then the type is an array. In an array, one or more elements must be specified via a comma-separated list of values.

An example of the designation of values in a hierarchy is as follows, with comments introduced by two forward slashes ("//"):

```
TREE test {
  ENTRY child {
    ATTRIBUTES {
      // Entry attribute "AttrName1" is an array of two
        bytes
      AttrName1=[byte[ ]:23,42];
    }
    PROPERTIES {
      // Assigns string "Hello, World!" to property
        "PropName1"
      PropName1=Hello, World!;
      // Property "Claimed" is boolean with a value of
        true
      Claimed=[boolean:true];
      // Property data is an array of four longs
      data=[long[ ]:23,87,9009834,345];
      // Property data_names is an array of four strings
      data_names=[string[ ]:width,height,weight,
        days_left];
    }
  }
}
```

Attributes assigned to the entry attribute domain must appear before any properties within the scope of the ENTRY keyword declaration. Thus, in the previous example, the attribute "AttrName1" is assigned to the entry, rather than to a property of the entry. All properties appear only to the entry and thus are always in the entry property domain. Thus, they may appear anywhere within the scope of the ENTRY declaration, except not within the scope of an ATTRIBUTES or another PROPERTIES declaration.

Attributes pertain to the last defined entry or property. Again, in order to be applied to the entry itself, the ATTRIBUTES declaration must immediately follow the ENTRY line before any properties are defined. Otherwise, the attributes will be assigned to the domain of the last defined property. The following example further illustrates assigning attributes and properties to a specific domain, with comments introduced by two forward slashes ("//"):

```
TREE test {
  ENTRY child {
    // These attributes are assigned to the entry
    ATTRIBUTES {
      name1=value1;
      name2=[integer:1024];
    }
    PROPERTIES {
      name1=value1;
      name2=[boolean:false];
      // These attributes are assigned to the property
        "name2"
      ATTRIBUTES {
        name1=[byte[ ]:4,5,8];
        name2=[string:I am name2];
      }
      name3=[char:H];
      name4=[booleano[ ]:true,true,false];
      // These attributes are assigned to the property
        "name4"
```

```
ATTRIBUTES {
    name1=attribute one;
    name2=[integer:777];
    name3=[char[ ]:a,b,c];
        }
      }
    }
}
```

Figure 9:
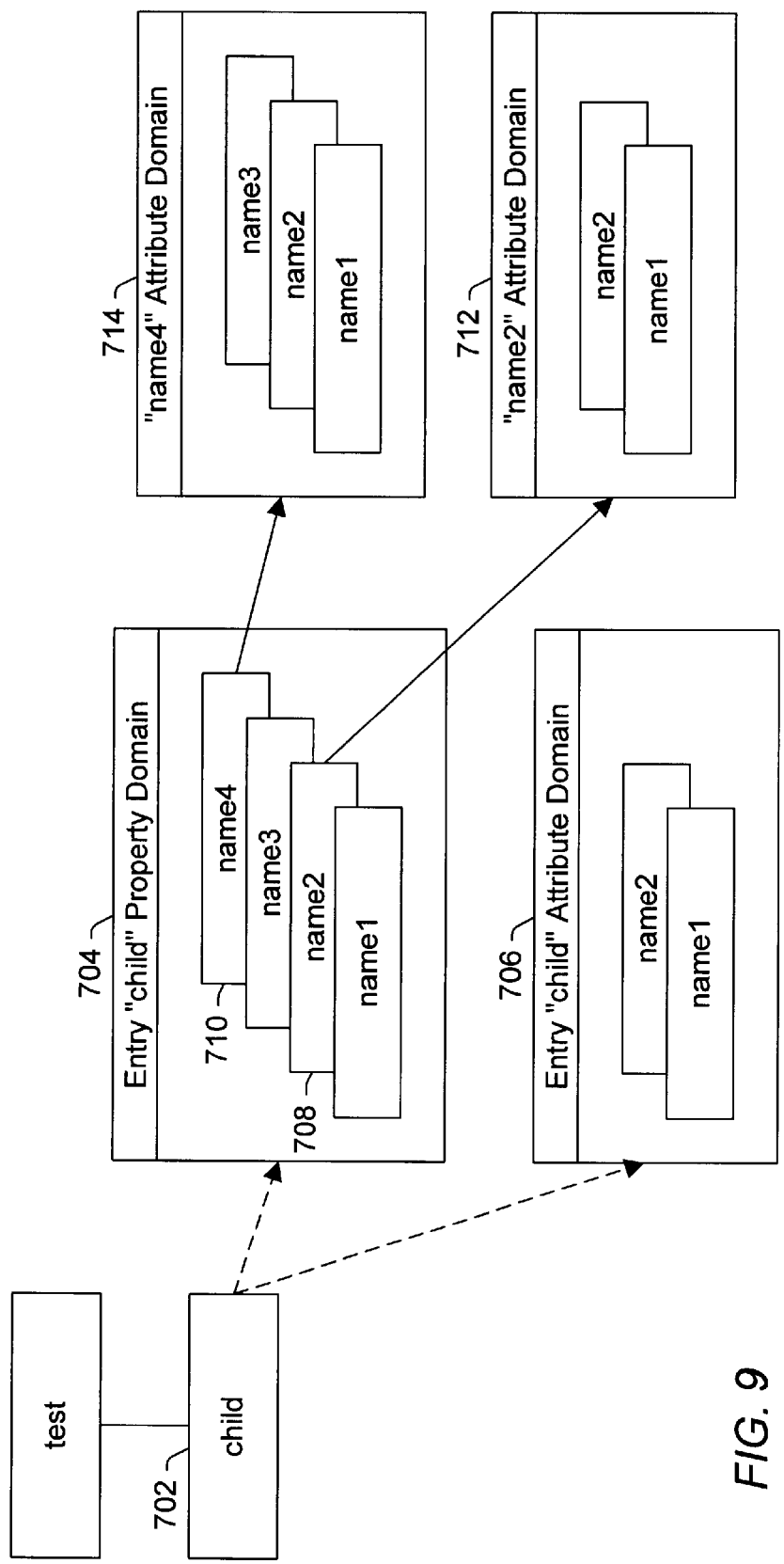
FIG. 9 is a further illustration of property domains and attribute domains in the grammar provided by one embodiment of the invention.

The entry and attribute domains of the previous example are further illustrated by FIG. 9. As described above, the child entry 702 has both a property domain 704 and an attribute domain 706. The entry property domain has four properties, including name2 708 and name4 710. Both name2 708 and name4 710 have attribute domains of their own: name2 attribute domain 712 and name4 attribute domain 714, respectively.

The database description grammar is language- and platform-independent. Nevertheless, a database description which follows the rules of the grammar can be compiled into an intermediate form and then used to populate the JSD. As used herein, compilation is any process of transforming information expressed in a first language to information expressed in a second language by applying one or more grammars to interpret and/or analyze the first form and create the second form. Usually, although not always for the purpose of this disclosure, compilation is a process of transforming information expressed in a higher-level language into information expressed in a lower-level language. The lower the level of a language, generally speaking, the easier it is for a computer to understand or execute: in other words, the more readable it is by a computer. The higher the level of a language, generally speaking, the more readable it is by a human.

In one embodiment, the compiler is a Java™ class called StaticTreeCompiler. An instance of StaticTreeCompiler requires four parameters to be passed to its constructor. The first two parameters are PrintStream instances: an error log and a debugging log. The third construction parameter is a debugging level that controls how much compilation progress information is output to the debug log. The fourth and final parameter is an instance of a StaticTree used by the compiler to obtain tokens. A token is a single meaningful element of a computer language, such as, for example, a keyword, a name associated with a keyword such as the name of an entry, a name for an attribute or property, a value for an attribute or property, an opening or closing brace to indicate scope, or another punctuation mark. In other words, the StaticTree is a persistent form containing a grammatical form of a database, as described in detail above.

The constructor stores these configuration parameters and then allocates a large scratch array of StaticEntries in preparation to compile the grammatical form to an intermediate form. The StaticEntry objects, which are instances of a StaticEntry class, represent entries in the intermediate form of the database. A StaticEntry object contains references to its parent, siblings, and children, as well as its properties (StaticProperty instances) and attributes (StaticAttribute instances). Furthermore, each StaticEntry contains the entry ID and name. The StaticAttribute, StaticProperty, and StaticEntry classes are defined as follows:

```
class StaticAttribute {
    public String attrName;
    public Object attrValue;
    StaticAttribute (String name, Object value) {
        attrName=name;
        attrValue=value;
    }
}
class StaticProperty {
    public String propName;
    public Object propValue;
    public StaticAttribute[ ]propAttributes;
    StaticProperty (String name, Object value) {
        propName=name;
        propValue=value;
    }
}
class StaticEntry {
    public StaticEntry entryParent;
    public StaticEntry entrySibling;
    public StaticEntry entryFirstChild;
    public int id;
    public String entryName;
    public StaticProperty[ ]entryProperties;
    public StaticAttribute[ ]entryAttributes;
    StaticEntry (StaticEntry parent, int ID, String name, int
        maxProperties) { . . . }
    public int addProperty(String name, Object value) { . .
        . }
    public StaticProperty lastPropertyAdded() { . . . }
    public int addAttribute(String attrName, Object value)
        { . . . }
    public int addAttribute(StaticProperty p, String
        attrName, Object value) { . . . }
    public void finalizeProperties() { . . . }
}
```

As discussed above, each instance of a StaticTreeCompiler has a reference to a StaticTree instance. The StaticTree instance in turn either has a reference to a file or to an array of Java language strings containing the grammatical form that is to be compiled. When the compile() method is invoked, the StaticTree's constructor builds either a stream or string tokenizer to process the grammatical form contained within the file or within the array of java.lang.String. The StaticTree class provides methods to the compiler such as getNextToken() and hasMoreTokens(). The compiler invokes these methods to parse the grammatical form into a series of tokens. The tokens cause the compiler to recognize the grammatical form and create StaticEntry, StaticProperty, and StaticAttribute objects that together comprise the intermediate form of the database. In one embodiment, in other words, the compiler is a recursive descent parser that repeatedly reads tokens from the StaticTree token parser until the grammatical form is fully consumed. The resulting StaticEntries are placed in the large scratch array. When the end of the grammatical form is recognized, a final array of StaticEntries is created that is the exact size as the number of entries defined in the grammatical form. The compiler also squeezes out unused space in each StaticEntry for properties and attributes.

Figure 10:
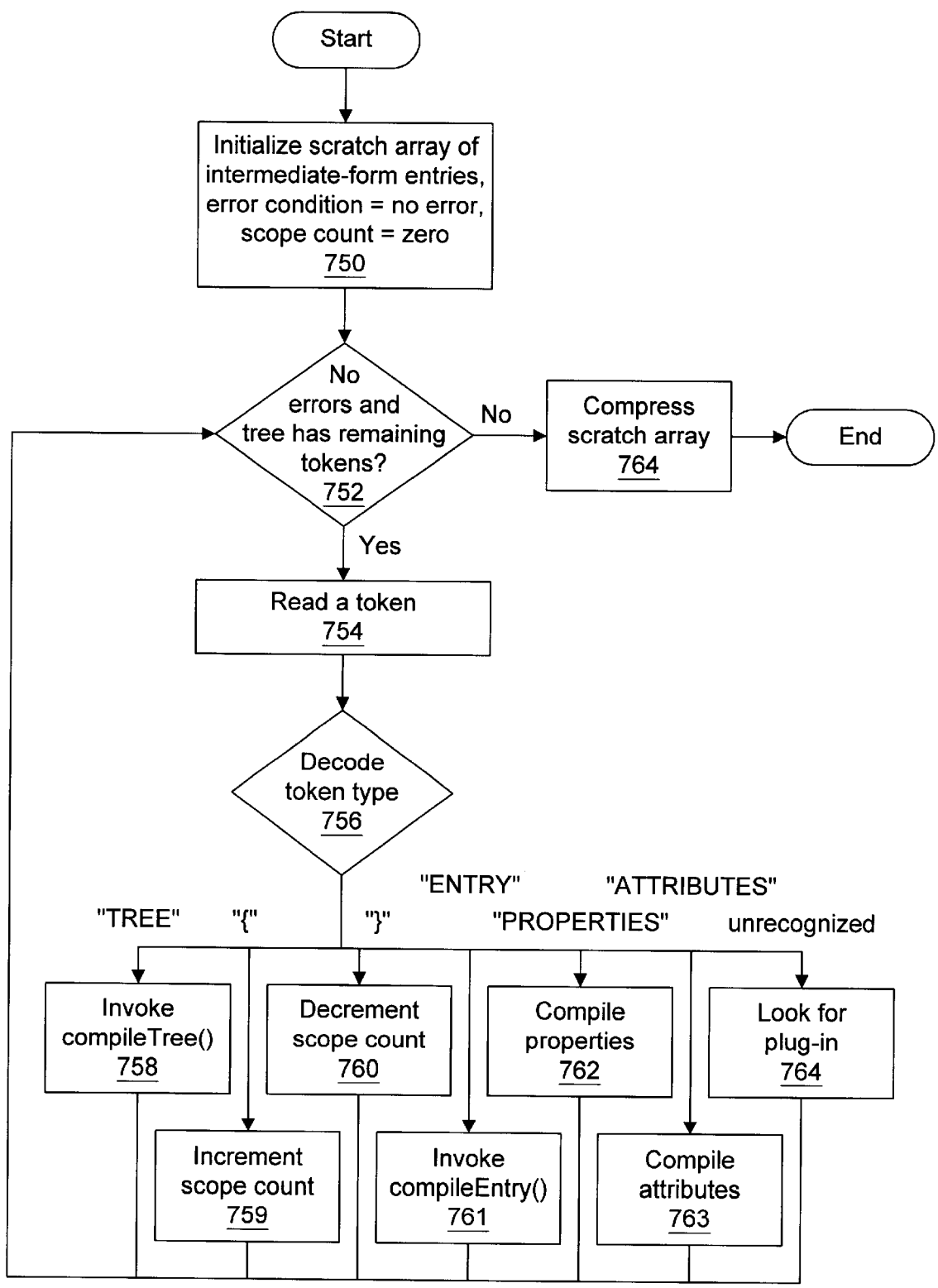
FIG. 10 is a flowchart illustrating compilation in one embodiment of the invention.

The compilation method according to one embodiment is described in more detail as follows. The compiler is started by calling or invoking the compile() method, which is illustrated in FIG. 10. In step 750 the compile() method initializes an error condition variable to "kNoErr" and initializes a grammar scope count (indicating depth in the hierarchy) to zero. Also in step 750, a large temporary or "scratch" array of intermediate-form entries is allocated to hold entries which will be produced by the compiler. In step 752 a loop is then entered that continues until either an error condition is discovered or the StaticTree parser fails to return a token. In step 754 the compiler reads the next token from the grammatical form. In step 756 the compiler decodes the token type. Each JSD tree defined in the grammatical form begins with the special token "TREE". If the token is determined in step 756 to be the beginning token "TREE", then in step 758 the compiler descends into a compileTree() method to compile the tree. The scope of each entry, property, or attribute begins with a "{" token and ends with a "}" token. If the token is determined in step 756 to be the beginning scope token "{", then in step 759 the grammar scope count is incremented. If the token is determined in step 756 to be the ending scope token "}", then in step 760 the grammar scope count is decremented. If the token is determined in step 756 to be "ENTRY", then in step 761 the compiler descends into a compileEntry() method to compile the entry. If the token is determined in step 756 to be "PROPERTIES", then in step 762 the compiler compiles the property or properties. If the token is determined in step 756 to be "ATTRIBUTES", then in step 763 the compiler compiles the attribute(s). If the token is determined in step 756 to be an unrecognized token, then the compiler searches for the appropriate plug-in to translate or otherwise process the unknown token. In one embodiment, for example, the "BUSINESS_CARD" token is supplied by a plug-in. Plug-ins for transformation customization are discussed in detail below.

Regardless of the token type, the compiler then loops back to step 752 to continue processing the grammatical form. After all the tokens in the grammatical form have been read and processed, then in step 764 the temporary scratch array of static entries is compressed to the exact size required to hold the intermediate form.

The compileTree() method has the following logic. A special StaticEntry to mark the tree root is allocated and initialized. Its ID is zero, and the compiler global variable that tracks the next ID to use is initialized to one. As the compiler processes each entry in the grammatical form of the database, an instance of StaticEntry is created and added to the large array of static entries. In doing so, the compileEntry() method is invoked, wherein a loop is entered that completes upon an error condition or upon encountering the end of the tree.

The compileEntry() method has the following logic. An error condition variable is initialized to "kNoErr" and a grammar scope count is initialized to zero. A loop is then entered that exits upon an error condition, upon the failure to read a token, or when the scope count indicates the end of the current entry's definition. The definition can include child entries and sets of properties and/or attributes. As the compiler processes each property and attribute defined in the grammatical form, instances of StaticProperty and StaticAttribute are added to the current StaticEntry using the addProperty and addAttribute methods, respectively. The current StaticEntry (the last one added to the array) is obtained by the compiler using a compiler instance variable containing the last array index (entry ID) used. The compiler can use the lastPropertyAdded() method to obtain a StaticProperty object that represents the last property added to the current entry.

Therefore, the compiler logic can be expressed in pseudo-code as follows:
public void compile() {
  Initialize scratch array of intermediate-form static entries
  while ( no errors AND tree to compile has tokens) {
    read a token
    decode token type
      tree begin token?
        if YES, compileTree()
      scope begin token?
        if YES, increment count
      scope end token?
        if YES, decrement count
      entry token?
        if YES, compileEntry()
      properties token?
        if YES, compile property or properties
      attributes token?
        if YES, compile attribute(s)
      unrecognized token?
        if YES, look for appropriate plug-in
  }
  Compress scratch array of intermediate-form static entries into final form, optimizing size
}

Figure 11:
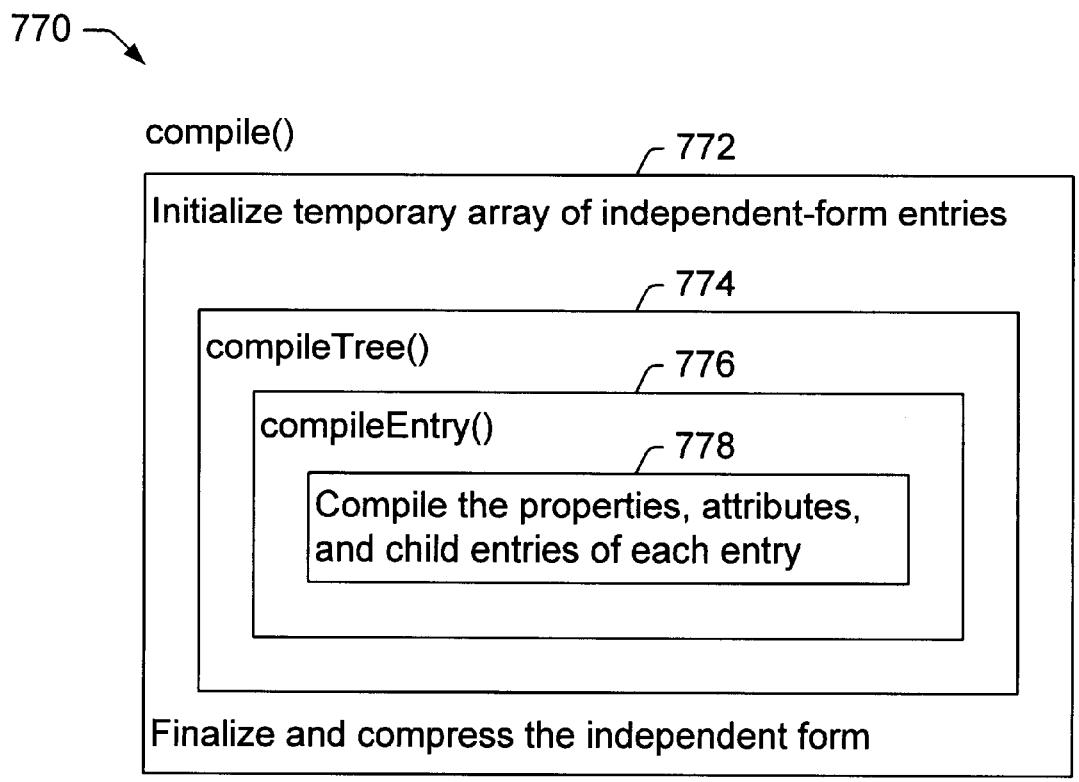
FIG. 11 is a diagram illustrating nested blocks within the compilation method in one embodiment of the invention.

Furthermore, the compiler logic can be expressed in nested blocks as shown in FIG. 11. The compile() method 770 has an outermost block 772 which begins by initializing a temporary array of independent-form entries, as explained above. When the "TREE" token is encountered, the compile() method 770 enters a next block or loop 774 by invoking the compileTree() method. For each entry in the tree, the compile() method then enters a block or loop 776 by invoking the compileEntry() method. Within the compileEntry() method 776, in block 778 the compiler compiles the properties, attributes, and child entries as described in the grammatical form. After all the entries have been compiled, the compile() method returns to the outermost block 772, in which the intermediate form of the database is finalized and compressed, as described above.

The StaticTreeCompiler produces an intermediate form, not a final form, of the database. The intermediate form lacks the infrastructure of the final database; for instance, the intermediate form is not designed to be accessible by particular application programs for storage of their configuration information. The intermediate form is accessed by the StaticTreePopulator which populates the database. Each StaticTreePopulator has an instance of a compiler and each instance of a compiler has a reference to a StaticTree instance. When the populator is constructed, its constructor is passed an instance of a StaticTree to compile. In one embodiment, therefore, compilation and population are both initiated when a StaticTree instance is passed to a StaticTreePopulator.

During StaticTreePopulator construction, the populator creates an instance of the compiler and then invokes the compile() method as discussed in detail above. The compile() method then creates the intermediate form. In one embodiment, the intermediate form is a simple array of JSD entry objects which are indexed by an entry ID. Each entry object is represented in the intermediate form as an instance of StaticEntry class. Therefore, the objects of the intermediate form are intelligent: they combine data with methods for manipulating the data. For example, the intermediate form includes methods for creating a database entry, creating a property associated with an entry, creating an attribute associated with an entry or a property, querying the last entry, property, or attribute created, and finalizing entry storage.

The compiler uses the constructor and utility methods to build up the intermediate form during the compilation process, as described in detail above. The populator directly accesses the array by entry ID. The entry IDs are bounds-checked against the StaticEntry array before the populator accesses the array of static entries. An invalid entry ID will cause the populator to return an invalidEntryIDException to the JSD. This error should never be encountered if all the IDs were generated by the compiler and returned by the populator.

In one embodiment, the process of populating the JSD is encapsulated in a Java™ Language interface called TreePopulator. Software components wishing to populate the database must implement this interface. In other words, developers who wish to create software components that populate the database should implement the TreePopulator interface in their Java™ applications. Those components that do implement the TreePopulator interface are referred to as database populators. The TreePopulator interface is defined as follows:

```
package javaos.javax.system.database;
public interface TreePopulator {
public int getRootEntry();
public String getEntryName(int entry);
public int getParentEntry(int entry);
public int getFirstChildEntry(int entry);
public int getPeerEntry(int entry);
public int getPropertyNameLength();
    public String getNextProperty(int entry, String prevPropName) throws
    SystemDatabaseException;
    public Object getPropertyValue(int entry, String propName) throws
    SystemDatabaseException;
    public int getAttributeNameLength();
    public String getNextAttribute(int entry, String prevAttrName) throws
    SystemDatabaseException.
    public String getNextAttribute(int entry, String propName,String prevAttrName)
    throws SystemDatabaseException;
    public Object getAttributeValue(int entry, String attrName) throws
    SystemnDatabaseException;
    public Object getAttributeValue(int entry, String propName, String attrName)
    throws SystemDatabaseException;
}
```

The TreePopulator interface is used by the JSD to import a set of entries, also referred to as a tree. JSD populators, that is, software components or applications which implement the TreePopulator interface, are not required to use the database description grammar. Like all JSD populators, however, grammar-based populators must implement the TreePopulator interface. The StaticTreePopulator class is the default implementation of a grammar-based populator. The StaticTreePopulator class encapsulates a compiler (StaticTreeCompiler) and a compiled tree of grammatically derived entries. As described above, the compilation takes place during the StaticTreePopulator construction process. If the compilation completes correctly, then the StaticTreePopulator is ready to populate the JSD.

The StaticTreePopulator understands the intermediate database format. Each invocation of the TreePopulator interface requires an intermediate-form entry lookup, and possibly a property or attribute lookup as well. The results of the lookup (entries, properties, or attributes) are then returned to the JSD for inclusion in the active cache of entries. During population, each level of the tree is read an entry at a time until all entries are returned to the JSD by the populator for inclusion into the active cache of published JSD entries. Each entry returned to the JSD is identified by a integer, known as an entry ID. The entry IDs are returned by the populator to the JSD. The JSD observes the integer as an opaque token unique to a single entry within the populator.

The first entry ID is used to kick-start the population process and is returned to the JSD by the getRootEntry() method. All subsequent entry IDs are returned by the following methods: getParentEntry(), getFirstChildEntry(), and getPeerEntry(). Each property associated with an entry is identified by a combination of an entry ID and a property name. Similarly, each attribute associated with an entry is identified by a combination of an entry ID and a attribute name. Each attribute associated with a property is identified by the tuple of entry ID, property name, and attribute name.

Normally, serialization and compilation as described above are only able to translate a finite, pre-defined set of primitive Java™ Language data types. In one embodiment, then, the StaticTreeSerializer and StaticTreeCompiler classes can only read and write values in terms of the following primitive data types: string, boolean, int, long, short, byte, char, double, float, and arrays thereof. However, some object-oriented databases may define complex data types: that is, data types which combine one or more of the primitive data types. For example, a complex data type could be an object which includes a string, two long integers, and an array of boolean values. To modify the grammar to describe these complex data types would render the grammar large and unwieldy. Therefore, to enable serialization and compilation to understand complex data types, in one embodiment a customization plug-in is provided.

In one embodiment, the plug-in comprises a Java™ Language interface called StaticTreePlugIn, which is defined as follows:

```
package javaos.javax.system.database.statictree;
import java.io.*;
import java.util.Hashtable;
public interface StaticTreePlugIn {
    public String compile(Hashtable properties) throws
        IllegalArgumentException;
    public void serialize(Hashtable properties) throws Ille-
        galArgumentException;
}
```

The StaticTreePlugIn interface should be implemented by a plug-in class for utilizing complex data types. In other words, developers who wish to utilize complex data types should design a particular plug-in class that implements the StaticTreePlugIn interface. In one embodiment, an example of such a plug-in is the "business card" discussed in conjunction with the database description grammar. The business card is a complex data type that includes a collection of properties and/or attributes for a particular software component.

In one embodiment, a plug-in functions as follows. When compiling a grammatical form that contains a complex data type, the compiler determines that the data type is not a known or recognized data type. The compiler then creates a hash table containing the primitive data types which make up the complex data type. In other words, the hash table contains the properties of the complex data type. The compiler then calls the compile() method of the plug-in and passes the hash table to the plug-in. The plug-in collapses the data types in the hash table down to a single, complex object. The compile() method of the plug-in returns the name of the complex property in String format. When serializing, on the other hand, the serializer passes a blank hash table to the serialize() method of the plug-in. The serialize() method of the plug-in should translate the complex object into a series of primitives and fill the hash table with the list of primitives.

Various embodiments of the present invention further include receiving or storing instructions and/or data implemented in accordance with the foregoing description upon a carrier medium. Suitable carrier mediums include storage mediums such as disk, as well as electrical signals or digital signals conveyed via a communication medium such as network 108 or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for transforming contents of an intermediate form of an object-oriented database into contents of said object-oriented database, said intermediate form and said object-oriented database being stored in a memory of a computer system, said method comprising:

expressing a plurality of entries corresponding to objects in said object-oriented database in said intermediate form, wherein said entries and said objects relate to configuration parameters of said computer system, wherein said intermediate form is derived from a textual form expressed according to a grammar;

populating said object-oriented database with said plurality of entries;

storing said plurality of entries in said object-oriented database in said memory of said computer system, wherein said plurality of entries in said object-oriented database pertain to one or more application programs installed on said computer system.

2. The method of claim 1, wherein said populating said object-oriented database with said plurality of entries occurs through a programming interface for accessing said object-oriented database.

3. The method of claim 1, wherein said object-oriented database is configured to be platform independent.

4. The method of claim 1, wherein said contents of said object-oriented database pertain to one or more application programs.

5. The method of claim 1, wherein said intermediate form includes an array of entries configurable to populate said object-oriented database.

6. The method of claim 1, wherein said entries of said intermediate form are objects, wherein said objects encapsulate data with methods.

7. The method of claim 1, wherein said memory of said computer system which stores said intermediate form and said object-oriented database is a volatile memory.

8. A carrier medium comprising program instructions for transforming contents of an intermediate form of an object-oriented database into contents of said object-oriented database, wherein said program instructions are executable to implement:

expressing a plurality of entries corresponding to objects in said object-oriented database in said intermediate form, wherein said entries and said objects relate to configuration parameters of a computer system, wherein said intermediate form is derived from a textual form expressed according to a grammar;

populating said object-oriented database with said plurality of entries; and storing said plurality of entries in said object-oriented database in a memory of said computer system, wherein said plurality of entries in said object-oriented database pertain to one or more application programs installed on said computer system.

9. The carrier medium of claim 8, wherein said populating said object-oriented database with said plurality of entries occurs through a programming interface for accessing said object-oriented database.

10. The carrier medium of claim 8, wherein said object-oriented database is configured to be platform independent.

11. The carrier medium of claim 8, wherein said contents of said object-oriented database pertain to one or more application programs.

12. The carrier medium of claim 8, wherein said intermediate form includes an array of entries configurable to populate said object-oriented database.

13. The carrier medium of claim 8, wherein said entries of said intermediate form are objects, wherein said objects encapsulate data with methods.

14. The carrier medium of claim 8, wherein said carrier medium is a storage medium.

15. A computer system for transforming contents of an intermediate form of an object-oriented database into contents of said object-oriented database, said computer system comprising:

a CPU;

a memory coupled to said CPU;

wherein said memory stores said object-oriented database;

wherein said memory stores program instructions executable by said CPU, wherein the program instructions are executable to:

express a plurality of entries corresponding to objects in said object-oriented database in said intermediate form, wherein said entries and said objects relate to configuration parameters of a computer, wherein said intermediate form is derived from a textual form expressed according to a grammar;

populate said object-oriented database with said plurality of entries;

store said plurality of entries in said object-oriented database in said memory, wherein said plurality of entries in said object-oriented database pertain to one or more application programs installed on said computer.

16. The computer system of claim 15, wherein said program instructions are further executable to populate said object-oriented database with said plurality of entries through a programming interface for accessing said object-oriented database.

17. The computer system of claim 15, wherein said object-oriented database is configured to be platform independent.

18. The computer system of claim 15, wherein said contents of said object-oriented database pertain to one or more application programs.

19. The computer system of claim 15, wherein said intermediate form includes an array of entries configurable to populate said object-oriented database.

20. The computer system of claim 15, wherein said entries of said intermediate form are objects, wherein said objects encapsulate data with methods.

* * * * *